United States Patent
Ross et al.

(10) Patent No.: US 11,645,277 B2
(45) Date of Patent: May 9, 2023

(54) GENERATING AND/OR UTILIZING A MACHINE LEARNING MODEL IN RESPONSE TO A SEARCH REQUEST

(71) Applicant: Google LLC, Mountain View, CA (US)

(72) Inventors: Steven Ross, Allison Park, PA (US); Christopher Farrar, Gibsonia, PA (US)

(73) Assignee: GOOGLE LLC, Mountain View, CA (US)

( * ) Notice: Subject to any disclaimer, the term of this patent is extended or adjusted under 35 U.S.C. 154(b) by 1345 days.

(21) Appl. No.: 15/838,269

(22) Filed: Dec. 11, 2017

(65) Prior Publication Data
US 2019/0179940 A1   Jun. 13, 2019

(51) Int. Cl.
*G06F 16/2453* (2019.01)
*G06N 5/02* (2006.01)
*G06N 20/00* (2019.01)
*G06F 16/953* (2019.01)

(52) U.S. Cl.
CPC ...... *G06F 16/24535* (2019.01); *G06F 16/953* (2019.01); *G06N 5/02* (2013.01); *G06N 20/00* (2019.01)

(58) Field of Classification Search
CPC . G06F 16/24535; G06F 16/953; G06N 20/00; G06N 5/02
See application file for complete search history.

(56) References Cited

U.S. PATENT DOCUMENTS

| | | | | |
|---|---|---|---|---|
| 6,044,347 | A * | 3/2000 | Abella | G10L 15/22 704/E15.04 |
| 7,461,059 | B2 * | 12/2008 | Richardson | G06F 16/24534 |
| 7,984,004 | B2 * | 7/2011 | Andrew | G06F 16/9535 706/45 |
| 8,185,523 | B2 * | 5/2012 | Lu | G06F 16/3326 707/723 |
| 8,443,013 | B1 | 5/2013 | Lin et al. | |
| 8,694,483 | B2 * | 4/2014 | Roulland | G06F 16/3325 707/706 |
| 9,026,479 | B1 * | 5/2015 | Baluja | G06F 16/9038 706/12 |

(Continued)

OTHER PUBLICATIONS

Davydov, et al. "Smart Autofill-Harnessing the Predictive Power of Machine Learning in Google Sheets;" Google Research Blog; (2014) 4 pages.

*Primary Examiner* — Debbie M Le
*Assistant Examiner* — Huen Wong
(74) *Attorney, Agent, or Firm* — Gray Ice Higdon

(57) ABSTRACT

Implementations relate to providing, in response to a query, machine learning model output that is based on output from a trained machine learning model. The machine learning model output can include a predicted answer to the query, that is predicted based on the trained machine learning model. The machine learning model output can additionally or alternatively include an interactive interface for the trained machine learning model. Some implementations relate to generating a trained machine learning model "on the fly" based on a search query. Some implementations additionally or alternatively relate to storing, in a search index, an association of a machine learning model with a plurality of content items from resource(s) on which the machine learning model was trained.

20 Claims, 7 Drawing Sheets

(56) References Cited

U.S. PATENT DOCUMENTS

| | | | |
|---|---|---|---|
| 9,269,057 B1* | 2/2016 | Chandra | G06N 20/00 |
| 9,524,473 B2 | 12/2016 | Schmidt | |
| 9,767,489 B1* | 9/2017 | Liu | G06Q 30/0277 |
| 10,824,959 B1* | 11/2020 | Chatterjee | G06N 3/08 |
| 2005/0165765 A1* | 7/2005 | Neruse | G06F 16/24532 |
| 2009/0187515 A1* | 7/2009 | Andrew | G06F 16/9535 |
| | | | 706/12 |
| 2009/0234711 A1* | 9/2009 | Ramer | G06F 16/635 |
| | | | 705/14.66 |
| 2010/0318537 A1* | 12/2010 | Surendran | G06F 16/36 |
| | | | 707/759 |
| 2012/0308121 A1* | 12/2012 | Datta | G06K 9/6263 |
| | | | 382/155 |
| 2012/0323951 A1* | 12/2012 | Caruntu | G06F 16/3322 |
| | | | 707/767 |
| 2015/0066630 A1* | 3/2015 | Ge | G06Q 30/0244 |
| | | | 705/14.43 |
| 2015/0242401 A1* | 8/2015 | Liu | G06F 16/951 |
| | | | 707/722 |
| 2015/0324454 A1* | 11/2015 | Roberts | G06F 16/93 |
| | | | 707/734 |
| 2017/0091670 A1* | 3/2017 | Gulin | G06N 20/00 |
| 2020/0167437 A1* | 5/2020 | Mallya Kasaragod | G06F 30/20 |
| 2020/0372076 A1* | 11/2020 | Li | G06N 3/08 |

\* cited by examiner

GENERATING AND/OR UTILIZING A MACHINE LEARNING MODEL IN RESPONSE TO A SEARCH REQUEST

BACKGROUND

A user can submit a search query, via an electronic device, to a search engine. The search engine identifies one or more resources that are responsive to the search query using, for example, a search index. The resources can include webpages, media, documents, content from structured database(s) (e.g., a knowledge graph, and/or other content. The search engine generates search results that correspond to the identified resources, and responds to the search query by providing the search results for audible and/or graphical presentation to the user via the electronic device. The search results can be provided in a manner that is based on rankings of the corresponding resources for the search query. The ranking of the resources can be based on various factors, such as relevancy of the resources to the submitted search query, popularity and/or other metrics for the resources (independent of the search query), etc.

However, in response to some search queries, a search engine may not be able to provide any search results and/or may be unable to provide one or more search result(s) that are of sufficient quality. This can be due to various circumstances, such as the information the user is seeking via the query not yet being available (and therefore inaccessible to the search engine) and/or the search engine (or associated components) not yet appropriately indexing or otherwise storing the information. As a result, in seeking information, a user may need to submit a large quantity of search queries before a search engine provides result(s) satisfying the informational needs of the user—or the user may submit a large quantity of search queries and the search engine may fail completely in providing any result that satisfies the informational needs. This can cause consumption of significant client device resources (e.g., in transmitting the search queries, in rendering the results to the search queries), search engine resources (e.g., in processing and responding to the search queries), and/or network resources (in transmitting data between the client device and the search engine). Such consumption of resources becomes even more significant when aggregated across the large quantity of client devices that often interact with a search engine.

SUMMARY

This specification is directed generally to methods, systems, and apparatus for generating and/or utilizing a machine learning model in response to a search request from a user. When submitting search requests, users may sometimes submit a request for information that may not be located with certainty. For example, a user can submit a request that is predictive in nature and that has not been predicted and/or estimated in existing sources. In these instances, a search engine can provide, for presentation to the user in response to a provided search query, one or more best answers and/or documents. However, it is often the case that none of the answers and/or documents can include a "good" answer to the user's query.

Implementations described herein relate to providing, in response to a query, machine learning model output that is based on output from a trained machine learning model. The machine learning model output can include a predicted answer to the query, that is predicted based on the trained machine learning model. The machine learning model output can additionally or alternatively include an interactive interface for the trained machine learning model. For example, the interactive interface can be a graphical interface that a user can interact with to set one or more parameters on which the machine learning model is to be utilized to generate a prediction, and the interactive interface can be updated in response to such user interaction to display a predicted value that is generated utilizing the one or more parameters and the trained machine learning model.

Some implementations described herein relate to generating a trained machine learning model "on the fly" based on a search query. For example, some of those implementations relate to determining training instances based on a received search query, training a machine learning model based on the determined training instances, and providing machine learning model output in response to the received search query—where the machine learning model output is generated based on the trained machine learning model. Some implementations described herein additionally or alternatively relate to storing, in a search index, an association of a machine learning model with a plurality of content items from resource(s) on which the machine learning model was trained. Those implementations can further relate to determining that the trained machine learning model is responsive to a search query based on matching feature(s) of the search query to content item(s) indexed with the machine learning model and, in response, providing machine learning model output in response to the received search query—where the machine learning model output is generated based on the trained machine learning model. Various machine learning models can be utilized in implementations described herein, such as neural network models, support vector machines, Bayesian networks, etc.

As a working example of some implementations, assume a user interacts with a client device to submit a query of "How many doctors will there be in China in 2050?" to a search engine. Assuming that an authoritative answer to this query is not included in one or more existing resources (such as a knowledge graph, a proprietary database of a company, and/or structured database), the user is typically provided search results that are responsive to one or more terms in the query (e.g., results including population of China, current number of doctors in China). However, none of these search results may provide a satisfactory answer to the user's query. Accordingly, various implementations described herein provide, in response to a query, a predicted answer to the query that is predicted based on a trained machine learning model and/or provide an interactive interface to the trained machine learning model, where the user can interact with the interface to be presented with the predicted answer and/or other answer(s) predicted using the trained machine learning model.

Continuing with the working example, the query can be parsed to determine one or more entities referenced in the search query, and at least one particular parameter, of the one or more entities, that is sought by the search query. For example, the query "How many doctors will there be in China in 2050?" can be parsed to identify an entity corresponding to "quantity of doctors in China" and a parameter corresponding to the year "2050" that is sought by the query. One or more structured databases can then be queried based on the at least one parameter and the one or more entities. For example, and continuing with the working example, a knowledge graph and/or other structured database(s) can be queried to determine if an entry is available for "quantity of doctors in China" in "2050" and, if so, if there is a known value defined for the entry. If it is determined that no entry is available, or there is no known value defined for the entry, variations of the parameter can be generated, and the structured database(s) queried based on the variations and the one or more entities to determine variation values for the variations. For example, and continuing with the working example, variations corresponding to the years of 2010, 2015, 2016, and 2017 can be determined as variations of the year "2050". Further, the structured database(s) can be queried based on those variations to determine the "quantity of doctors in China" for each of the years. Parallel querying and/or joint database querying can be utilized to determine values for the variations more quickly. Moreover, the portion(s) of the structured database(s) queried can be cached or otherwise stored in various "quick retrieval" computer readable media (e.g., random-access memory (RAM) and/or solid-state drive (SSD)) to enable quick querying and/or retrieval.

Training instances for a machine learning model can then be generated based on the variation parameters and their corresponding values, and the machine learning model trained utilizing the training instances. For example, a first training instance can include training instance input indicative of the year "2010" and training instance output indicative of the quantity of doctors in China in the year "2010", a second training instance can include training instance input indicative of the year "2015" and training instance output indicative of the quantity of doctors in China in the year "2015", etc. Accordingly, the machine learning model can be trained to enable processing, using the trained machine learning model, of a provided year to predict a quantity of doctors in China based on the provided year.

After the machine learning model is trained, machine learning model output that is based on the trained machine learning model can be provided in response to the search query. For example, the parameter from the query (e.g., "2050" in the working example) can be processed using the trained machine learning model to generate a prediction (e.g., a "quantity of doctors in China" in the working example), and the prediction provided as machine learning model output. Also, for example, an interactive interface that enables interaction with the trained machine learning model can additionally and/or alternatively be provided. For instance, and continuing with the working example, the interactive interface can include an interactive field that accepts various years as input, or an interactive drop-down menu that enables selection of any one of various years— and the inputted or selected year can be processed using the machine learning model to generate a prediction that can be rendered in the interactive interface. The machine learning model output (e.g., the prediction and/or the interface) can optionally be provided along with an indication that the machine learning model output is indeed a prediction (e.g., with text such as "this output is a PREDICTION based on a trained machine learning model").

The prediction provided as machine learning model output for presentation to the user is based on one or more predicted values generated over the machine learning model. In some implementations, the prediction provided for presentation is a single value, such as a single predicted quantity of doctors in China in the working example. In some of those implementations, the single value is based on (e.g., strictly conforms to) a single predicted value generated over the trained machine learning model—or the machine learning model generates multiple predicted value(s) (e.g., a range of values, a primary value with a standard deviation, a set of confidence intervals) and the single value is based on one of those predicted values. In some implementations, the prediction provided as machine learning model output for presentation to the user is (or indicates) multiple values, such as a predicted range of the quantity of doctors in China in the working example. In some of those implementations, the multiple values are based on multiple predicted values generated over the trained machine learning model. For example, a machine learning model can be trained to enable prediction of probabilities for each of X classes, and the machine learning model output can include indications of multiple of those classes along with an indication of the corresponding probability for each of the classes. For instance, indications for all of the classes having a corresponding probability that satisfies a threshold can be provided, along with their corresponding probabilities.

In some implementations, after a machine learning model is trained, the trained machine learning model can be validated to ensure predictions generated utilizing the trained machine learning model are of at least a threshold quality, and machine learning model output that is based on the trained machine learning model provided only if the trained machine learning model is validated. If the predictions are not of at least the threshold quality, machine learning model output that is based on the trained machine learning model can be suppressed (i.e., not provided for presentation to a computing device of a user that submitted a corresponding query). In those situations, other (e.g., non-machine learning based) search results can be provided for presentation in lieu of any machine learning model output. Various model validation techniques can be utilized. As one example, less than all generated training instances can be utilized to train the machine learning model, and training instances that were not utilized to train the machine learning model (hold out training instances) can be utilized to validate the trained machine learning model. For example, the training instance input of a hold out training instance can be processed using the trained machine learning model to generate a predicted output, and the predicted output compared of the training instance output of the hold out training instance. The threshold quality of the trained machine learning model can be based on a difference between the predicted output and the training instance, as well as additional differences determined utilizing additional hold out training instances. In these and other manners, the accuracy and/or robustness of the trained machine learning model can be verified prior to providing any machine learning model output based on the trained machine learning model.

As another working example of some implementations, the above-described techniques can be utilized to generate a trained machine learning model based on a private database (e.g., private to a group of users, a corporation, and/or other restricted set(s)). For instance, a user can be an employee of an amusement park and submit a query of "How many snowcones will we sell tomorrow," which cannot be known with certainty. The private database can be private to the amusement park, and can be queried based on the query to identify an entity associated with "snowcone sales", but a value may not be defined in the private database for a parameter of "tomorrow" (e.g., tomorrow's date), or an entry for the parameter "tomorrow" may not be included in the private database. However, the private database can be queried based on the "snowcone sales" entity and variations of the parameter "tomorrow". For example, the private database can be queried to identify snowcone sale values (e.g., an actual quantity sold) for multiple preceding days. Further, for example, additional parameters and corresponding values can be identified based on the querying, such as additional parameters that are associated with the snowcone sales for the preceding days. Those could include, for example, weather information for the previous days, attendance information for the previous days, etc.

Training instances can then be generated based on the identified values, and the predictive model trained based on the training instances. For example, a first training instance can include training instance output of quantity of snow cones sold for a particular day, and training instance input that includes a day of the week for that particular day (e.g., Mon., Tue., etc.), a high temperature for that particular day, whether it rained on that particular day, and park attendance for that particular day. Also, for example, a second training instance can include training instance output of quantity of snow cones sold for an additional particular day, and training instance input that includes a day of the week for that additional particular day, a high temperature for that additional particular day, whether it rained on that particular additional day, and park attendance for that particular additional day. In some implementations, values for one or more of the training instances can optionally themselves be predicted utilizing a previously trained machine learning model. For example, the high temperature for a particular day can be a predicted high temperature (instead of the actual recorded high temperature) that was predicted by a separate trained weather prediction machine learning model.

An interface can then be provided in response to the query. The user can interact with the interface to enter in a day of the week, a predicted high temperature, and predicted attendance—and receive a predicted quantity of snow cone sales that is predicted based on processing of the inputted values utilizing the trained machine learning model. In some implementations, the predicted high temperature and/or the predicted attendance can instead be determined without user input. For example, such predictions can themselves be predicted utilizing a previously trained machine learning model (e.g., predicted high temperature predicted by a separate weather prediction machine learning model). When machine learning model output is provided in response to a query after training of the machine learning model "on the fly", it is understood that a delay may be present between the submission of the query and the provision of the machine learning model output. Nonetheless, the machine learning model output is still provided for presentation at a computing device of a user that submitted the search query, and is provided based on the user having submitted the search query. For example, machine learning model output can be "pushed" to a client device of the user at a later time, after the machine learning model has been trained, and optionally after the user has performed additional searching and/or other activities utilizing the client device. The machine learning model output can be pushed via various applications, such as an automated assistant application. Pushing the machine learning model output can include causing a visual and/or audible notification to be surfaced on a mobile computing device of the user, and can include causing it to be surfaced independent of the user again submitting the query and/or another query. In some implementations, the notification includes the machine learning model output itself (e.g., a prediction and/or an interactive interface). In some other implementations, the notification includes a hyperlink or other selectable element that, when selected, causes the machine learning model output to be presented.

In some implementations where a delay is present between the submission of the query and the provision of the machine learning model output, a prompt or other notification can be provided to the user immediately responsive to the query (e.g., along with search result(s) responsive to the query). The prompt can be provided based on determining that "good" result(s) are not available for the query and/or can inform the user that a machine learning model is being (or can be) trained based on the search query and that machine learning model output will be (or can be) subsequently provided. This may cause the user to await the pushing or other providing of such machine learning model output in lieu of the user issuing computationally expensive follow-up search(es). In some implementations, the prompt can convey that the machine learning model output will be subsequently pushed to a computing device of the user, or can include a hyperlink or other manner by which the user can later access the machine learning model output. In some additional or alternative implementations, training and/or subsequent pushing of the machine learning model can be contingent on the user providing affirmative user interface input in response to the prompt. For example, the prompt can be "A good answer is not available. Do you want me to predict an answer for you?" and a machine learning model can be trained only if affirmative user interface input is received in response to the prompt and/or machine learning model output can be subsequently provided only if affirmative user interface input is received. The affirmative user interface input can be, for example, spoken input or selection of an interface element (e.g., a "yes" element) provided with the prompt. This can ensure that computational resources are not wasted training in training a machine learning model to generate machine learning model output that will be ignored.

In some implementations, where a trained machine learning model is generated utilizing training instances generated based on private database(s), such training instances and/or the training of the machine learning model based on such training instances can occur at one or more devices that are authorized to access the private database(s). As one example, if the private database(s) are locally stored on a client device that submitted a search query, the training instances and/or the training can occur locally at the client device using one or more processors of the client device. In these and other manners, privacy of data of private database(s) is maintained through utilization, in generating training instances and/or in training, of only device(s) authorized to access such data.

In some implementations, a trained machine leaning model can be indexed by one or more content items from resources utilized to train the model and the model can be stored for later use in providing machine learning model output in response to queries. Such a machine learning model can be one generated "on the fly" as described above, or can be generated utilizing other techniques. For example, based on the previous "doctors in China" working example, the trained machine learning model can be indexed by content items, such as content items from a knowledge database that are associated with "China" and "doctors." Content items can include, for example, content from training instances utilized to train the trained machine learning model, table and/or column descriptors in a database, entities in webpage names, and/or other entities associated with a resource that is utilized to train the predictive model. Subsequently, a user can provide a query of "How many doctors will there be in China in 2040" and content items of "China" and "doctors" can be identified in the query and utilized to identify the previous trained machine learning model. Content from the user's query can then be processed using the machine learning model to generate a predicted answer, and the predicted answer provided to the user in response to the search query. Alternatively or additionally, an interface can be provided to the user to allow the user to submit additional parameters and/or parameter values to receive additional predicted answers based on the model.

In some implementations, an indexed machine learning model can be indexed with one or more properties of "necessary" inputs that must be provided for the model to make a prediction. For example, and using the previous example, a trained machine learning model can require a year to provide a predicted answer. In other words, although "China" and "doctors" can be utilized to identify the particular model, only inputs with a "year" can be utilized to predict an answer for the user. For example, the user may provide a query of "How many doctors will there be in China in the future?" and the particular model, indexed by entities associated with "China" and "doctors," can be identified. Further, a necessary input of "<year>" can be required for the model. In some implementations, the user can be further prompted to provide a year. Alternatively or additionally, the user can be provided an interface to allow the user to further input a year and receive a predictive answer.

Some of these and other implementations of the specification can achieve various technical advantages. For example, providing machine learning model output for presentation to the user can enable the user to satisfy his/her informational needs via the machine learning model output, and without requiring the user to submit additional varied queries in seeking such information. This can reduce the use of various computational resources, such as resources that would otherwise be consumed in association with submission of the additional varied queries. Also, for example, in some implementations that present an interactive interface as the machine learning model output, a user can iteratively interact with the interactive interface to obtain predictive output for varied input. For instance, in the preceding snowcone example, the user can interact with the interface to obtain predicted snowcone sales for a first set of parameters, interact with the interface again to obtain predicted snowcone sales for a second set of parameters, etc. Such multiple predictions can be determined through processing of the parameters using the trained machine learning model to generate predicted output, and updating the interface based on the predicted output. Such processing can be significantly more computationally efficient than processing that would instead be required in responding to multiple searches.

As another example, various implementations described herein provide technical means for generating training instances and/or training a machine learning model "on the fly", and optionally without any human intervention. As yet another example, various implementations described herein provide technical means for richly indexing various trained machine learning models (trained "on the fly" or otherwise) based on, for example, content from training instances utilized to train the machine learning models and/or underlying resources from which the training instances were generated. This can enable the machine learning models to be identified as relevant to various search requests and corresponding machine learning model output provided in response to those search request. As mentioned above, such machine learning model output can quickly and/or efficiently convey information. Additional and/or alternative technical advantages can be achieved, such as those described elsewhere herein.

In some implementations, a method performed by one or more processors is provided that includes receiving a search query submitted by a client device of a user in response to user interface input provided by the user at the client device. The method further includes parsing the search query to determine one or more entities referenced in the search query and to determine at least one parameter, of the one or more entities, that is sought by the search query. The method further includes querying a structured database based on the at least one parameter and the one or more entities, and determining, based on the querying, that a known value for the at least one parameter is not defined for the one or more entities in the structured database. The method further includes, in response to determining that the known value for the at least one parameter is not defined, the querying the structured database based on variations of the at least one parameter and the one or more entities to retrieve, for each of a plurality of the variations of the parameter, a variation value that is defined in the structured database for a corresponding one of the plurality of the variations of the at least one parameter. The method further includes generating training instances that each include: training instance input that is based on a corresponding one of the plurality of the variations of the at least one parameter, and training instance output that is based on the retrieved variation value for the corresponding one of the plurality of the variations of the at least one parameter. The method further includes training a machine learning model utilizing the generated training instances, and transmitting, to the client device or an additional client device of the user and based on receiving the search query, machine learning model output that is based on the machine learning model trained in response to determining that the known value for the at least one parameter is not defined.

These and other implementations of technology disclosed herein can optionally include one or more of the following features.

In some implementations, the method further includes generating a predicted value for the at least one parameter of the search query utilizing the machine learning model. In some of those implementations, the machine learning model output is based on the predicted value for the at least one parameter of the search query. In some versions of those implementations, generating the predicted value for the at least one parameter of the search query utilizing the machine learning model includes: applying the at least one parameter as at least part of input to the machine learning model; and processing the input utilizing the machine learning model to generate the predicted value. The machine learning model output can further include additional content indicating that the predicted value is predicted.

In some implementations, the machine learning model output further includes an interactive interface for the trained machine learning model. In some of those implementations, the interactive interface includes a graphical interface the method further includes: receiving the parameter or an additional parameter in response to further user interface input directed to the interactive interface, generating a predicted value for the parameter or the additional parameter utilizing the machine learning model, and causing the graphical interface to be adapted to display the predicted value generated utilizing the machine learning model.

In some implementations, the method further includes storing, in an index, an association of the machine learning model with one or multiple of: the one or more entities, the at least one parameter, and the variations. In some of those implementations, the method further includes: receiving, after the indexing, an additional search query; parsing the additional search query to determine that the additional search query includes one or multiple of the one or more entities, the at least one parameter, and the variations; and determining that the machine learning model is responsive to the search query based on the search query including one or multiple of the one or more entities, the at least one parameter, and the variations, and the machine learning model also having the association in the index with, the one or multiple of the one or more entities, the at least one parameter, and the variations; and responding to the additional search query utilizing the machine learning model based on determining that the machine learning model is responsive to the search query.

In some implementations, the structured database is a knowledge graph.

In some implementations, the method further includes the steps of determining that none of any resources responsive to the search query satisfy one or more criteria. In some of those implementations, querying the structured database based on the variations of the at least one parameter, generating the training instances, and/or training the machine learning model are further in response to determining that none of the any resources responsive to the query satisfy the criteria.

In some implementations, querying the structured database based on variations of the at least one parameter and the one or more entities includes querying at least a portion of the structured database that is cached in random-access memory or a solid-state drive.

In some implementations, a method performed by one or more processors is provided that includes generating training instances based on one or more resources, training a machine learning model utilizing the training instances, and storing, in a search index, an association of the machine learning model with a plurality of content items from at least one of the one or more resources. The method further includes receiving, via a network interface, a search query submitted by a client device of a user in response to user interface input provided by the user at the client device, and determining that the machine learning model is responsive to the search query. Determining that the machine learning model is responsive to the search query is based on matching one or more features of the search query to the content items stored in the index in association with the machine learning model. The method further includes, in response to determining that the machine learning model is responsive to the search query, f transmitting, to the client device or an additional client device of the user and in response to receiving the search query, machine learning model output that is based on the machine learning model.

These and other implementations of technology disclosed herein can optionally include one or more of the following features.

In some implementations, the content items stored in the index in association with the machine learning model include training instance content items, from the at least one of the one or more resources, wherein the training instance content items are utilized in generating one or more of the training instances.

In some implementations, generating the training instances includes generating one or more training instances based on values from a table of the at least one of the resources, and the content items stored in the index in association with the machine learning model include a title of the table or a column descriptor from the table.

In some implementations, the at least one of the one or more resources includes a webpage, and the content items stored in the index in association with the machine learning model include content associated with the webpage, such as a title of the webpage or an entity stored in association with the webpage.

In some implementations, the method includes determining, based on the search query, input to apply to the machine learning model, and generating a predicted value based on processing the input utilizing the machine learning model. In those implementations, the machine learning model output is based on the predicted value for the at least one parameter of the search query. In some of those implementations, the machine learning model includes additional content indicating that the predicted value is predicted.

In some implementations, the machine learning model output includes an interactive interface for the trained machine learning model. In some of those implementations, the interactive interface includes a graphical interface. In some versions of those implementations, the method further includes: receiving the parameter or an additional parameter in response to further user interface input directed to the interactive interface; generating a predicted value for the parameter or the additional parameter utilizing the machine learning model; and causing the graphical interface to be adapted to display the predicted value generated utilizing the machine learning model.

In some implementations, a method implemented by one or more processors is provided and includes receiving, via a network interface, a search query submitted by a client device of a user in response to user interface input provided by the user at the client device. The method further includes determining that a machine learning model is responsive to the search query based on matching one or more features of the search query to one or more content items stored in association with the machine learning model. The method further includes, in response to determining that the machine learning model is responsive to the search query: transmitting, to the client device or an additional client device of the user and in response to receiving the search query, machine learning model output that is based on a prediction generated using the machine learning model. In some implementations: the machine learning model is one previously automatically trained in response to a previous search query; and/or at least one of the one or more content items stored in association with the machine learning model and matched to at least one of the one or more features of the search query was previously automatically stored in association with the machine learning model in response to being included in a resource based on which the machine learning model was trained. In those implementations where the machine learning model is one previously automatically trained in response to a previous search query, the previous automatic training of the machine learning model can include training the machine learning model based on training instances automatically generated in response to the previous search query.

In addition, some implementations include one or more processors (e.g., central processing unit(s) (CPU(s)), graphics processing unit(s) (GPU(s)), and/or tensor processing unit(s) (TPU(s)), where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

In some instances, a user can submit a search query to a search application, which then can identify, based on the terms of the search query, one or more content items that are responsive to the search. For example, a user can submit a search query of "How many doctors are in China" to a search application and the search application can identify one or more content items, such as webpages and/or other documents, that are responsive to search query. The search application can parse the query, identify entities associated with terms in the search query, and then further identify responsive documents in one or more databases that can be responsive to the search query. Further, the search application can determine a relevancy score for the identified content items and provide a listing of indications of the content items to the user. The user can then select one or more of the indications and view the contents of the documents and/or other content items that have been provided in response to submitting the search query, However, in some instances, the search application can determine that one or more searched resources (e.g., a structured database, a database of indexed webpages, a database associated with the user) do not include responsive information and/or do not include responsive information of at least a threshold "quality". For example, the user can submit a search query of "How many doctors will be in China in 2050" and the search application may not identify content that is responsive to the query. Thus, in some instances, the search application can determine that a machine learning model should instead be trained and utilized to provide a "best guess" response to the user. Output from the trained model can then be provided to the user in response to the search query, either separately or in combination with additional identified content.

Figure 1:
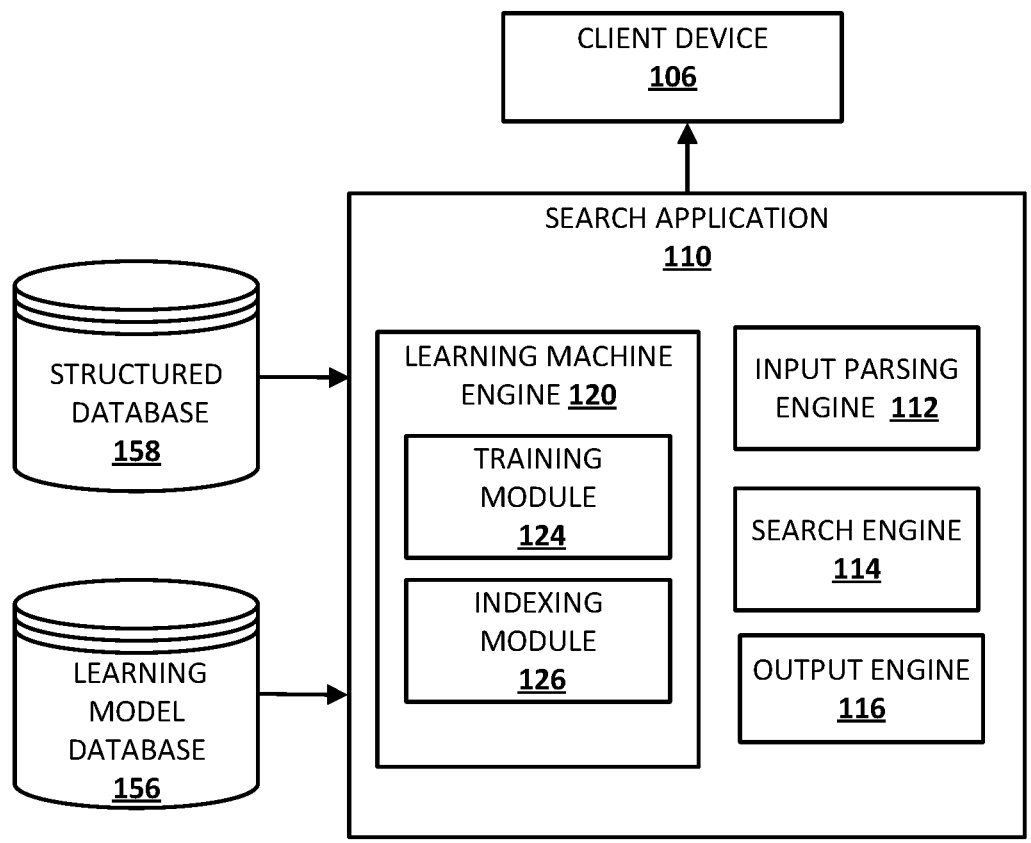
FIG. 1 is a block diagram of an example environment in which implementations disclosed herein can be implemented.

Now turning to FIG. 1, an example environment in which techniques disclosed herein can be implemented is illustrated. The example environment includes a client device 106, a search application 110, a learning machine engine 120, an input parsing engine 112, a search engine 114, and an output engine 116. The client device 106 can be, for example, a standalone voice-activated speaker device, a desktop computing device, a laptop computing device, a tablet computing device, a mobile phone computing device, a computing device of a vehicle of the user, and/or a wearable apparatus of the user that includes a computing device (e.g., a watch of the user having a computing device, glasses of the user having a computing device, a virtual or augmented reality computing device). Additional and/or alternative client devices can be provided.

Although search application 110 is illustrated in FIG. 1 as separate from the client device 106, in some implementations all or aspects of search application 110 can be implemented by the client device 106. For example, in some implementations input parsing engine 112 can be implemented by the client device 106. In implementations where one or more (e.g., all) aspects of search application 110 are implemented by one or more computing devices remote from the client device 106, the client device 106 and those aspects of the search application 110 communicate via one or more networks, such as a wide area network (WAN) (e.g., the Internet). Similarly, while learning machine engine 120 and its constituent components are depicted as part of search application 110, this is not required, and one or more of these components can be implemented separately.

Although only one client device 106 is illustrated in combination with the search application 110, in many implementations the search application 110 can be remote and can interface with each of a plurality of client devices of multiple users. For example, the search application 110 can receive search requests from each of the multiple devices. For instance, the search application 110 in some implementations can be implemented as a cloud-based service employing a cloud infrastructure, e.g., using a server farm or cluster of high performance computers running software suitable for handling high volumes of requests from multiple users. However, for the sake of simplicity, many examples herein are described with respect to a single client device 106.

The search application 110 includes an input parsing engine 112, a search engine 114, an output engine 116, and a learning machine engine 120. In some implementations, one or more of the engines of search application 110 can be omitted, combined, and/or implemented in a component that is separate from search application 110. Moreover, search application 110 can include additional engines not illustrated herein for the sake of simplicity.

Figure 2:
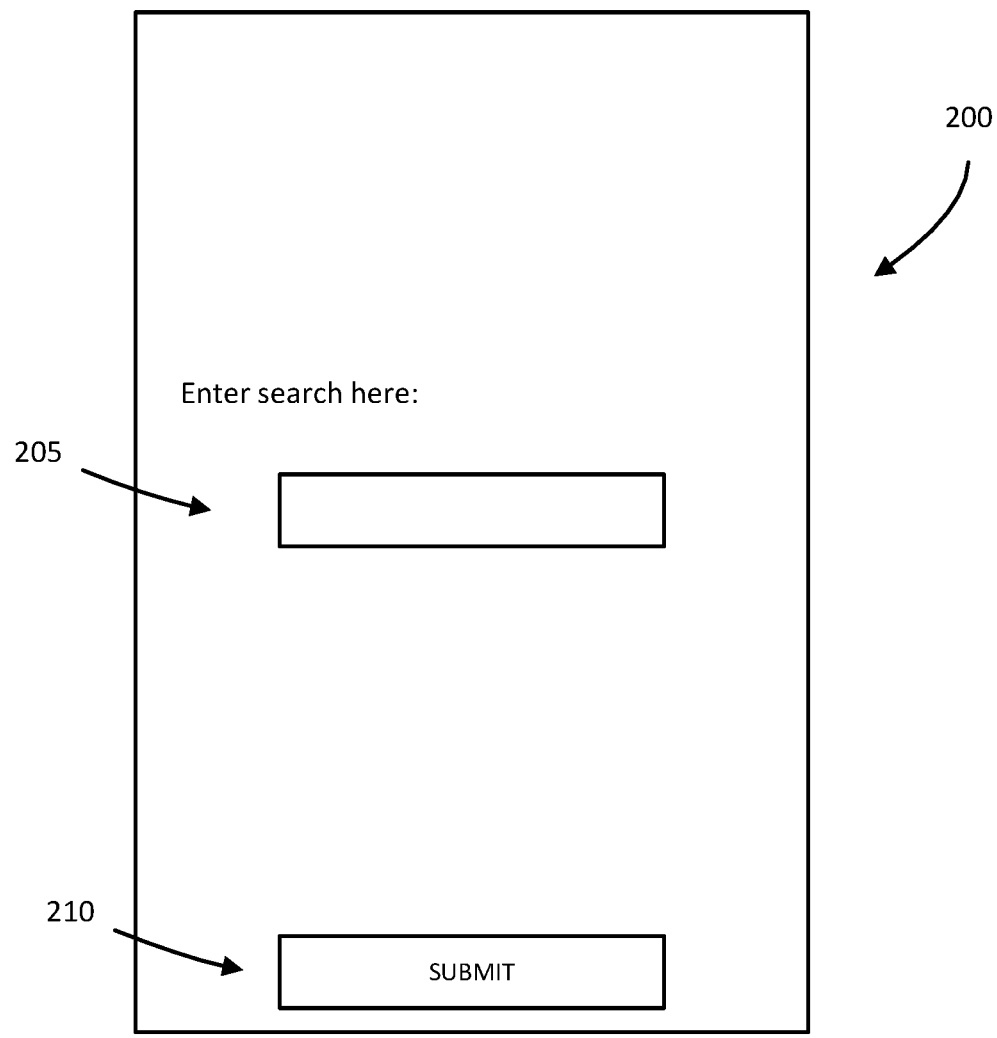
FIG. 2 is an example interface that a user can utilize to provide a search request.

The search application 110 receives instances of user input from the client device 106. For example, the search application 110 can receive a search query that a user has submitted via client device 106. The search query can be, for example, a string of text, audio, and/or other media that is indicative of the user having interest in being provided one or more content items that are responsive to the query. For example, referring to FIG. 2, a search application interface is provided. The interface 200 includes a text box 205 wherein the user can submit a text-based search query. In the provided interface, the user has submitted the query "How many snowcones will the park sell tomorrow." Further, the interface includes a submit button 210 and the user can select the submit button to indicate that the search query is complete and ready for further processing.

Input parsing engine 112 processes queries, and optionally other input, that are submitted to the search application 110, and generates annotated output for use by one or more other components of the search application 110. For example, the input parsing engine 112 can process natural language free-form textual input that is generated based on user interface input generated by a user via client device 106. The generated annotated output includes one or more annotations of the textual input and optionally one or more (e.g., all) of the terms of the textual input.

In some implementations, the input parsing engine 112 is configured to identify and annotate various types of grammatical information in textual input. For example, the input parsing engine 112 can include a part of speech tagger configured to annotate terms with their grammatical roles. Also, for example, in some implementations the input parsing engine 112 can additionally and/or alternatively include a dependency parser configured to determine syntactic relationships between terms in textual input.

In some implementations, the input parsing engine 112 can additionally and/or alternatively include an entity tagger configured to annotate entity references in one or more segments such as references to people, organizations, locations, and so forth. The entity tagger can annotate references to an entity at a high level of granularity (e.g., to enable identification of all references to an entity class such as people) and/or a lower level of granularity (e.g., to enable identification of all references to a particular entity such as a particular person). The entity tagger can rely on content of the natural language input to resolve a particular entity and/or can optionally communicate with a knowledge graph or other entity database to resolve a particular entity.

Input parsing engine 112 identifies one or more parameters in the inputting search query that are being sought by the query. For example, in a search query of "how many doctors will be in China in 2050," input parsing engine 112 can determine that "quantity of doctors in China" as an entity and a parameter of "2050" that is being sought by the query. Once entities in the search query and parameters being sought have been determined, search engine 114 queries structured database 158 to determine search results responsive to the query. In some implementations, the structured database 158 can be a database of webpages, audio, video, and/or other documents, such as spreadsheets and/or other text documents. In some implementations, structured database 158 can be a knowledge graph. In some implementations, the structured database 158 can include publicly available content, such as content available via the Internet. For example, for a search query of "How many doctors will be in China in 2050," search engine 114 can receive an entity of "quantity of doctors in China," and a parameter of "2050" from input parsing engine 112 and query one or more webpages via the Internet to identify pertinent information. The search engine 114 searches the structured database 158 to identify one or more resources, if any, that are responsive to the query. In some implementations, the structured database 158 includes database(s) that index publicly available resources and/or database(s) that index resources that are private to the user. The search engine 114 can utilize the databases 154 to identify responsive resources and can generate search results based on the identified responsive resources. In some implementations, one or more of the structured databases 158 can be remote from the search application and/or any separate client computing device, and/or one or more of the structured databases 158 can be local to the system 120 and/or any separate client computing device. In this specification, the term "database" is used to refer to any collection of structured or unstructured data stored in one or more computer readable media.

In some implementations, structured databases 158 can be limited to one or more specific structured databases, such as a database maintained by a particular organization, such as a proprietary database, and only query that database. For example, an amusement park may have a database that includes, inter alia, sales data in spreadsheets. Input parsing engine 112 can identify "snowcones," "sales," and "tomorrow" as entities, with a parameter of "sales tomorrow" as what is being sought, and search engine 114 can query a structured database 158 that includes the sales information from the amusement park. In some implementations, multiple structured databases can be queried. For example, in addition to querying a structured database that includes sales information for the amusement park, search engine 114 can also query one or more webpages and/or other documents from a second structured database 158 that includes weather information for the location of the amusement park.

The search engine 114 can utilize various techniques in searching the search databases 158 in response to a query, such as conventional and/or other information retrieval techniques. Scores are calculated for the resources identified by search engine 114 using one or more ranking signals, such as popularity of the resources, a degree of matching between the search parameters and the resources, attributes of the user (e.g., a location of the user, a primary language of the user), etc. The search engine 114 further includes one or more components that ranks the responsive resources using the scores.

The search engine 114 uses the identified responsive ranked resources to generate one or more search results. The search result(s) include search result(s) corresponding to the resource(s) that are responsive to the search issued based on the query. For example, each of the search results can include a title or other synopsis of a responsive content item, a summary of the content item, a link to the responsive content item, other information related to the responsive content item, and/or even the entirety of the content item.

In some implementations, in response to a query, the search engine 114 can identify a resource that is indicated in one or more of the search databases 158 as including content that is an authoritative answer to the query. In some of those implementations, the search engine 114 can generate a search result that includes the authoritative answer and provide that search result for presentation prominently in response to the query (e.g., for presentation as the only responsive search result or presentation more prominently than other search results). For instance, an authoritative answer can be provided for visual presentation in a so-called "one box" and/or provided for audible recitation to the user (whereas content from other responsive resources, if any, may not). In some implementations, the search engine 114 can determine that an entry in a knowledge graph, or other database, includes one or more fields that indicate an authoritative answer to a query. For example, for a query "how many doctors are currently in China" the search engine 114 can identify a knowledge graph entry corresponding to "quantity of doctors in China" and identify a "2017" field for that entry that indicates the number of doctors in China in 2017. Such authoritative information can be included by the search engine 114 in an authoritative answer to the query.

The ranked search result(s) generated by the search engine 114 are provided by the output engine 116 in response to the query. The output engine 116 provides the ranked search result(s) for presentation to the user via one or more client devices 106. For example, the output engine 116 can provide the search results for audible and/or visual presentation via one or more client devices 106. In some implementations, the search application 110 can be implemented as, or be in communication with, an automated assistant that engages in dialog sessions with the user. In some of those implementations, the search application 110 can receive a query from the user during a dialog session and can provide search result(s) in response to the query as part of the dialog between the user and the search application 110.

The search engine 114 further determines, for various queries, whether resources returned for those queries satisfy one or more criteria, such as one or more quality criteria. In some implementations, the search engine 114 utilizes one or more features of resource(s) identified as responsive to a query to determine whether the resource(s) satisfy the quality criteria for the query. For example, the search engine 114 can determine whether a resource satisfies one or more quality criteria based on one or more search ranking signals for the resource and/or a cumulative ranking score for the resource. For instance, the search engine 114 can determine that a highest ranked resource responsive to a query satisfies the quality criteria only if it has at least a threshold ranking score. As another example, the search engine 114 can determine that a resource satisfies a quality criterion only if it has an indication, in one or more of the search databases 158, as including content that is an authoritative answer to the query. As yet another example, the search engine 114 can determine that a resource satisfies a quality criterion only if it is an entry in a knowledge graph or other resource that includes a field that contains a value that indicates the desired information for the query.

In some instances, search engine 114 can identify a value for the sought parameter. However, in some instances, search engine 114 can determine that a value is not available for the parameter. For example, using the previous example, search engine 114 can determine that the number of snowcones to be sold on July 2 (a future date) is not available in the structured database 158 (e.g., search engine 114 can identify a table of snowcone sales and further determine that an entry for July 2 is not available). Thus, because the sought parameter does not have a known value, search engine 114 can determine that a machine learning model can be trained and utilized to provide a response to the search query.

In response to determining that a known value is not defined for the parameter being sought in the search query, search engine 114 can query the structured database 114 to identify variations of the parameter and/or variations of the entities in the search query where values are known. For example, based on the entity of "quantity of snowcones sold" and a parameter of "July 2," search engine 114 can identify snowcone sales in structured database 158 for July 1, June 30, and/or July 2 of the previous year. Further, search engine 114 can identify amusement park ticket sales for one or more days in the past from structured database 158. Also, for example, input parsing engine 112 can identify an entity associated with "hot weather" that is related to snowcones, and search engine 114 can query a database of historical weather data for dates around July 2.

Once values for the variations of the parameter being sought and/or entities have been identified, a learning model can be instantiated. Learning machine engine 120 utilizes the variations from the sought parameter and values for the variations, and generates a machine learning model that can then be utilized to provide output to the user in response to the search query. Training module 124 generates training instances based on the variations of the parameter (e.g., past snowcone sales) and values (e.g., the number sold on each day), as well as variations on identified entities (e.g., past weather information) and values (e.g., the temperature on past days). The training instances are then used to train a machine learning model.

Figure 3:
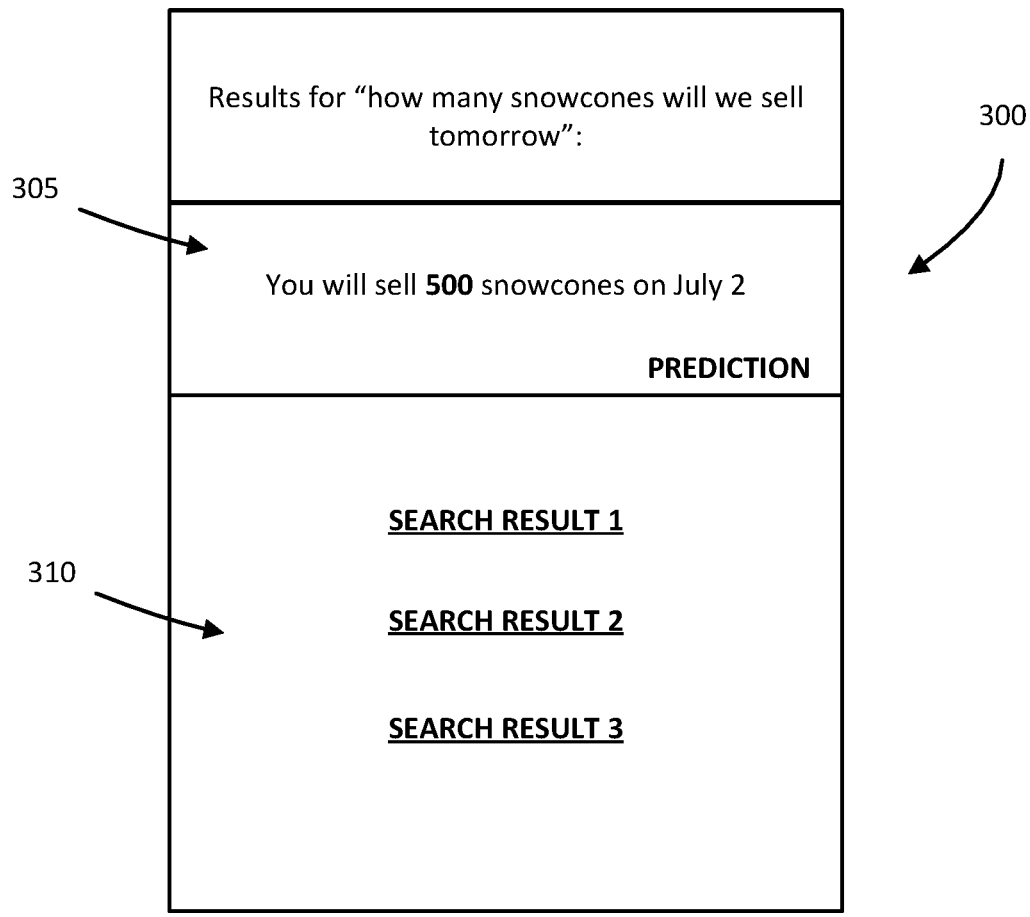
FIG. 3 is an example interface that can be provided to a user via an electronic device in response to a user-submitted search query.

In some implementations, a machine learning model trained by training module 124 can be utilized to process has one or more inputs and to generate produces one or more outputs based on the processing. As an example, the machine learning model trained with the training instances described herein can be trained to enable processing of have a date as input and to enable generation of can have a number of snowcones predicted to be sold on that date as an output. Thus, once a machine learning model is trained, the output generated utilizing of the model can be utilized to provide a predicted response that can be provided to the user. Output engine 116 provides the predicted response, that is based on output generated utilizing of the machine learning model, to the user via client device 106. In some implementations, the output engine 116 generates processes data utilizing the trained machine learning model to generate a predicted output (i.e., performs inference utilizing the trained machine learning model). In some other implementations, a separate inference engine is provided to perform inference. In some implementations, the output can be provided to the user and identified as a predicted answer. For example, referring to FIG. 3, an interface is illustrated for providing a user with output from a trained machine learning model. The interface 300 includes a predicted output indication 305 and additional search results 310. The additional search results 310 can be determined utilizing one or more alternative methods for identifying documents responsive to a search query, ranking the results based on relevancy, and providing indications of the responsive documents. The predicted output indication 305 includes a predicted value (i.e., "500") for the sought parameter (i.e., "number of snowcones that will be sold on July 2"). Further, to differentiate the result determined by the machine learning model and the results identified by alternate methods, the predicted output indication 305 includes an indication of "PREDICTED." Thus, the user is able to clearly differentiate results that are based on existing resources with the predicted result from the trained machine learning model.

Figure 4:
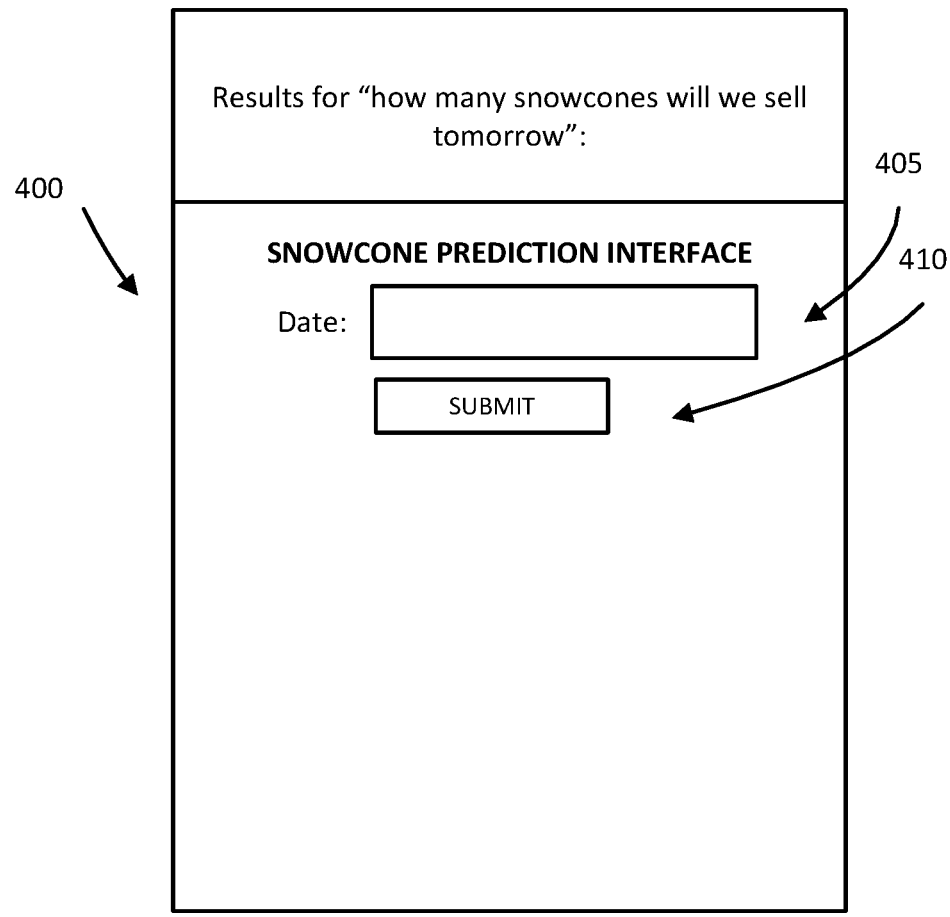
FIG. 4 is another example interface that can be provided to a user via an electronic device in response to a user-submitted search query.

In some implementations, the user is provided an interface to allow the user to provide additional input to the machine learning model and be provided, in response, additional predicted answers. For example, referring to FIG. 4, an interface to a machine learning model is provided. The interface 400 can be provided via client device 106 by output engine 116 and includes a text box 405 for the user to enter a date. The user can then provide a date (e.g., July 3) and select the submit button 410. The input entered into the text box 405 is then provided as input to the trained machine learning model, and output similar to the predicted output of FIG. 3 can be provided to the user. Alternatively or additionally, interface 400 can include text boxes for providing input related to weather, the type of food of interest for predicted sales, and/or other input. Further, the interface illustrated in FIG. 4 can include additional search results, other predicted responses, and/or other information related to the inputted search query and/or results identified by search engine 114.

In some implementations, the trained machine learning model can be stored in learning model database 156 by indexing module 126. The stored model can be accessed at a later time to predict one or more parameter values when a future search query is submitted. For example, indexing module 126 can store and index the model with one or more entities identified from the search query, one or more parameters that were sought by the search query, and/or one or more of the variations of the parameters that were identified and utilized to train the machine learning model. For example, a search query of "how many snowcones will we sell tomorrow" may result in a machine learning model being generated and trained, and the model can be indexed by an entity "snowcone sales." The machine learning model can be automatically indexed by the entity "snowcone sales" based on having been generated in response to a search query that includes snowcone sales. As described herein, it can additionally or alternatively be automatically indexed by content (e.g., terms) from one or more resources used to generate training instances on which it was trained. If, at a later time, the user (or an additional user) re-submits the same query, indexing module 126 can identify the model in learning model database 156 based on the query being associated with the parameter "snowcone sales" and additional input from the new query (e.g., a new future date) can be provided to the model. Output generated by the model can then be provided to the user in response to the submitted query.

In some implementations, indexing module 126 can index a trained machine learning model by one or more content items from the resources utilized to train the model. In some implementations, the content items can be one or more of the parameters, variations of parameters, and/or values that were utilized to generate the training instances. For example, indexing module 126 can index a machine learning model that predicts the number of doctors in China in the future with "doctors," "China," and/or previous dates at which the doctors in China is known.

In some implementations, the content items can be one or more titles and/or descriptors identified in the resources utilized to generate the training instances. For example, search engine 114 can identify a table from a database and/or spreadsheet as a resource and training module 124 can generate training instances for the machine learning model based on information in the table. Indexing module 126 can identify a table name, a column name, and/or other descriptor of the resource table as values by which to index the machine learning model. Once the model has been trained, indexing module 126 can store the model in learning model database 156 with the identified content item(s) being used to index the model. Subsequently, a new search query can be submitted and model can be identified by indexing module 126 based on associations between one or more terms in the new search query and the stored content item index of the model.

In some implementations, a user can define training instances and the defined instances can then be utilized to train the machine learning model. For example, a user can create a spread sheet with columns labeled as "date," "attendance," "temperature," and "snowcones sold." The table can then include values in the cells that the user has identified from historical information. Column labels and/or other information in the table can then be utilized by training module 124 to determine entities and/or parameters for the machine learning model.

In some implementations, a webpage can be identified by search engine 114 as a resource and indexing module 126 can identify a title and/or entity associated with the webpage as values by which to index the trained machine learning model. For example, search engine 114 can identify a webpage with a weather prediction as a resource, and indexing module 126 can automatically store the trained machine learning model along with an association of the title of the webpage, one or more terms in the title, and/or entities referenced in the webpage.

In some implementations, indexing module 126 can identify a stored model and determine that one or more necessary input parameters for the identified model are not included in the search query. For example, a stored model can be identified based on a search query of "how many snowcones will we sell" without a future date. Output engine 116 can provide a prompt to the user to indicate a date to utilize as input to the model and/or an interface similar to interface 400 can be provided to the user to allow the user to provide a future date.

Figure 5:
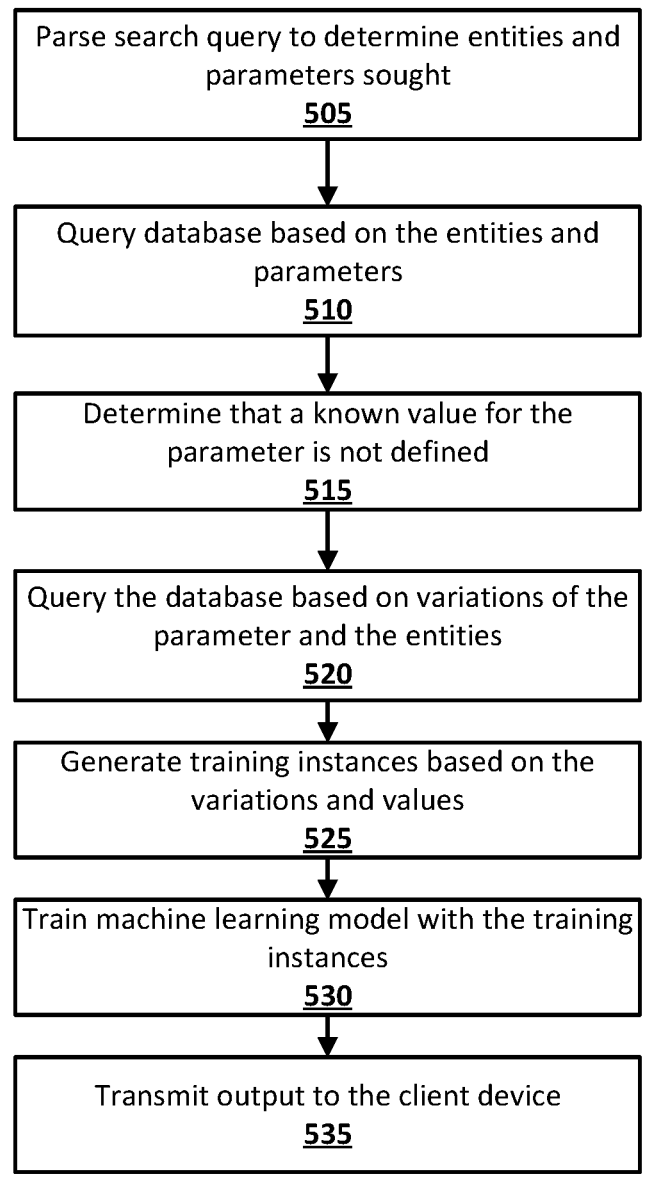
FIG. 5 illustrates a flowchart of a method for training a learning model in response to a search request.

FIG. 5 illustrates a flowchart of an example method according to implementations disclosed herein. One or more steps may be omitted, performed in a different order, and/or one or more additional steps may be included in various implementations.

At step 505, a submitted search query is parsed to determine one or more entities and one or more parameters begin sought by the search query. The parsing can be performed by a component that shares one or more characteristic with input parsing engine 112. The search query can be parsed into one or more tokens, which then can be utilized to identify one or more entities with aliases of the tokens and/or that are otherwise associated with entities in a knowledge graph or entity database. Further, input parsing engine 112 identifies one or more tokens and/or entities as a parameter that is being sought by the query. For example, in a search query of "how many doctors will be in China in 2050," input parsing engine 112 can identify "doctor" and "China" as entities, and "doctors in China in 2050" as a parameter that is being sought by the query.

At step 510, one or more structured databases are queried to identify documents and/or values responsive to the parameter sought by the search query. The databases can include, for example, a knowledge graph, a public database, one or more resources associated with the user, and/or other repositories of structured information. The resources can be identified and/or queried by an entity that shares one or more characteristics with search engine 114.

At step 515, search engine 114 determines that a known value for the sought parameter is not defined and/or is not locatable. For example, search engine 114 can identify a table in a database with sales information but identifies that, for a given date, information is unavailable. Further, search engine 114 can determine that, based on the parameter, a machine learning model can be utilized to predict a response to provide to the user.

At step 520, variations of the parameter are determined and utilized to search for values in the resources. The variation parameters are parameters that are related to the sought parameter but that include values in the resources. For example, for a sought parameter of snowcones that will be sold tomorrow, variation parameters can include snowcones sold on previous days, the weather on previous days, historic park attendance information, and/or other parameters that are variations on the sought parameter. Values for the variation parameters are identified in one or more structured databases or other resources.

At step 525, training instances for a machine learning model are generated based on the variations, entities, and values. For example, the training instances can include attendance for a day, temperature for the day, and date, and the output can be the number of snowcones sold on that date.

At step 530, the training instances are utilized to train the model. For example, training instance input of a training instance can be processed using the machine learning model to generate a training prediction, and the training prediction compared to training instance output of the training instance to determine an error, and the error can be back propagated over the machine learning model to update weights of the machine learning model (e.g., learned weights of perceptrons in a neural network model). This can be performed for each of the training instances (or until other training criterion/criteria are satisfied) to iteratively update the weights of the machine learning model. Batch training techniques can additionally or alternatively be utilized.

At step 535, output from the trained machine learning model is provided to the client device. In some implementations, the output can be a predicted value for the sought parameter and can be labeled as a prediction to differentiate the output from other search engine output. In some implementations, the output can be a graphical interface, such as interface 400, that allows the user to interact with the model.

Figure 6:
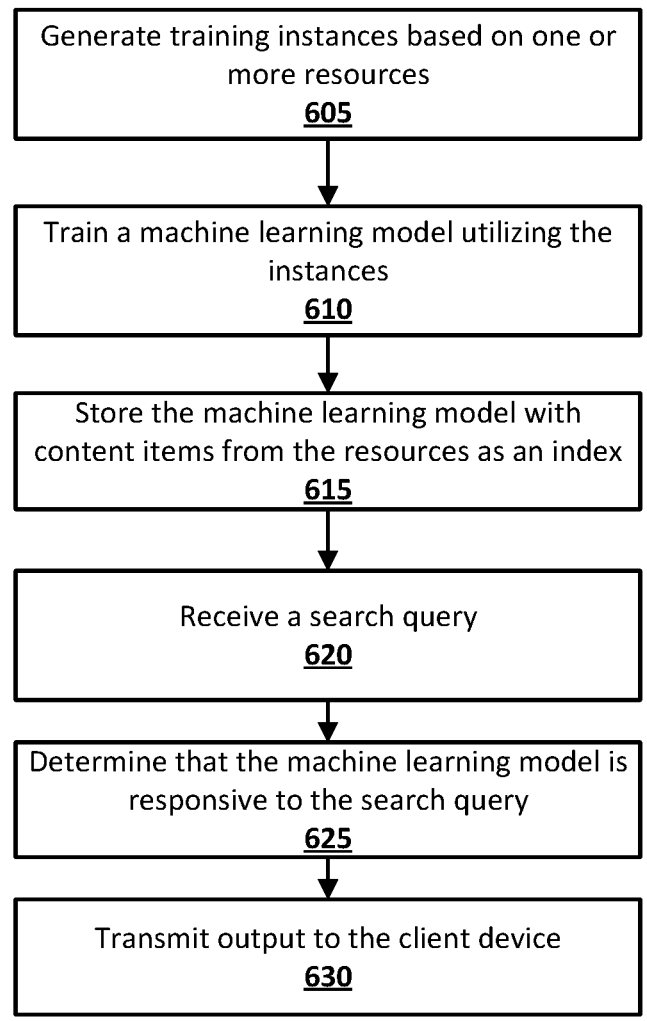
FIG. 6 illustrates a flowchart of a method for indexing a trained learning model based on a search request.

FIG. 6 illustrates a flowchart of an example implementation of methods described herein. One or more steps may be omitted, performed in a different order, and/or one or more additional steps may be included in various implementations.

At step 605, training instances are generated based on one or more resources. The resources can be identified based on, for example, relevancy to input from a user and/or from resources identified in one or more searches of a structured database. For example, the resources can be identified based on resources identified in a structured database as described with regards to FIG. 5. Resources can include, for example, tables in a database, entities of a knowledge graph, webpages, and/or other documents.

At step 610, a machine learning model is trained utilizing the training instances generated at step 605. Step 610 can share one or more characteristics with step 530 of FIG. 5 and as described herein.

At step 615, the trained machine learning model is automatically stored with one or more content items from the resources as an index. Content items can include, for example, aliases of entities identified in a knowledge graph, table names, column names, webpage names, entities referenced in one or more webpages utilized as resources, and/or other entities related to entities and/or parameters referenced in resources. The automatic storing of content item(s), in association with the model in an index, can be in response to those content items being included in one or more resources from which the training instances were generated. In these and other manners, the machine learning model can be richly and automatically indexed to enable a search engine to identify it as responsive to various relevant search queries, and resultantly provide machine learning model output (that is based on the trained machine learning model) in response to those search queries.

At step 620, a submitted search query is received. The search query can be parsed by a component that shares one or more characteristics with input parsing engine 114. In some implementations, the parsed query can be utilized to identify one or more entities and/or one or more parameters that are sought by the search query.

At step 625, the machine learning model is identified as responsive to the search query based on the indices of the model and the search query. For example, the search query can include an alias of an entity that is related to an entity that is associated with the model and/or an entity that is associated with one or more of the content items utilized to index the model. Once the model is identified, the search query can be utilized to provide input to the machine learning model, as previously described (e.g., with respect to FIG. 5).

At step 630, machine learning model output is provided for presentation to the user. The output can be, for example, a prediction for a sought parameter and/or an interface to allow the user to interact with the identified machine learning model. For example, the machine learning model output can be a prediction that is based on from predicted value(s) generated based on processing, using the machine learning model, of input values that are based on the search query and/or otherwise determined. For example, some of the input values can be based on the search query and other of the input values can be predicted (e.g., utilizing another machine learning model).

Figure 7:
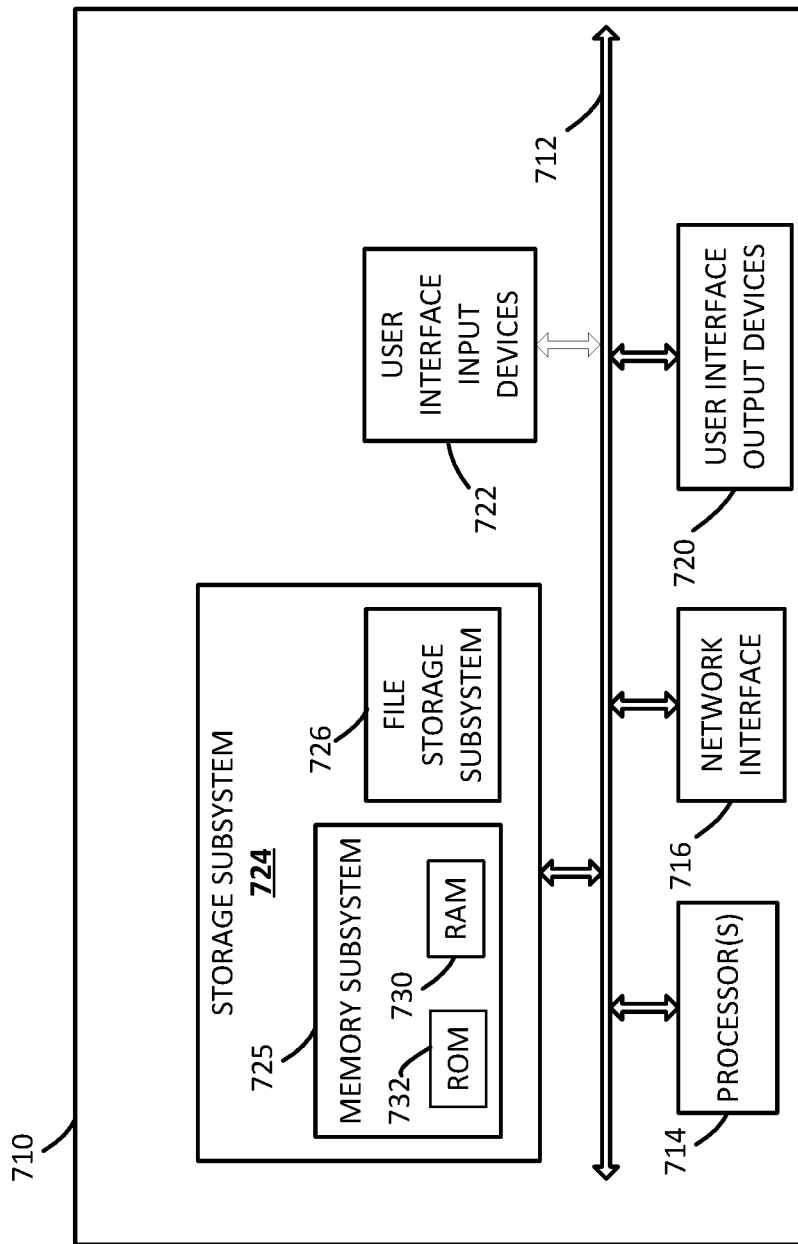
FIG. 7 illustrates an example architecture of a computing device.

FIG. 7 is a block diagram of an example computing device 710 that can optionally be utilized to perform one or more aspects of techniques described herein. In some implementations, one or more of device 106, search application 110, and/or other component(s) can comprise one or more components of the example computing device 710.

Computing device 710 typically includes at least one processor 714 which communicates with a number of peripheral devices via bus subsystem 712. These peripheral devices can include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 can include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 can include the logic to perform selected aspects of the method(s) of FIG. 5.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem can use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

The invention claimed is:

1. A method implemented by one or more processors, comprising:
receiving, via a network interface, a search query submitted by a client device of a user in response to user interface input provided by the user at the client device;
parsing the search query to determine one or more entities referenced in the search query and to determine at least one parameter, of the one or more entities, that is sought by the search query;
querying a structured database based on the at least one parameter and the one or more entities;
determining, based on the querying, that a known value for the at least one parameter is not defined for the one or more entities in the structured database, wherein determining that the known value for the at least one parameter is not defined comprises determining, based on the querying, that no entry is available in the structured database for the at least one parameter and the one or more entities;
in response to determining that the known value for the at least one parameter is not defined:
determining variations of the at least one parameter;
querying the structured database based on the determined variations of the at least one parameter and the one or more entities to retrieve, for each of a plurality of the determined variations of the parameter:
a variation value that is defined in the structured database for a corresponding one of the plurality of the determined variations of the at least one parameter;
generating training instances that each include:
training instance input that is based on a corresponding one of the plurality of the determined variations of the at least one parameter, and
training instance output that is based on the retrieved variation value for the corresponding one of the plurality of the determined variations of the at least one parameter;
training a machine learning model utilizing the generated training instances;
generating at least one predicted value for the at least one parameter of the search query utilizing the machine learning model; and
transmitting, to the client device or an additional client device of the user and based on receiving the search query, machine learning model output that is based on the machine learning model trained in response to determining that the known value for the at least one parameter is not defined, the machine learning model output including the predicted value for the at least one parameter of the search query.

2. The method of claim 1, wherein generating the predicted value for the at least one parameter of the search query utilizing the machine learning model comprises:
applying the at least one parameter as at least part of input to the machine learning model; and
processing the input utilizing the machine learning model to generate the predicted value.

3. The method of claim 2, wherein the machine learning model output further comprises additional content indicating that the predicted value is predicted.

4. The method of claim 1, wherein the machine learning model output further comprises an interactive interface for the trained machine learning model.

5. The method of claim 4, wherein the interactive interface comprises a graphical interface and further comprising:
receiving an additional parameter in response to further user interface input directed to the interactive interface;
generating an additional predicted value for the additional parameter utilizing the machine learning model; and
causing the graphical interface to be adapted to display the additional predicted value generated utilizing the machine learning model.

6. The method of claim 1, further comprising:
storing, in an index, an association of the machine learning model with one or multiple of:
the one or more entities,
the at least one parameter, and
the variations.

7. The method of claim 6, further comprising:
receiving, after the indexing, an additional search query;
parsing the additional search query to determine that the additional search query includes one or multiple of:
the one or more entities,
the at least one parameter, and
the variations; and
determining that the machine learning model is responsive to the search query based on the search query including, and the machine learning model also having the association in the index with, one or multiple of:
the one or more entities,
the at least one parameter, and
the variations; and
responding to the additional search query utilizing the machine learning model based on determining that the machine learning model is responsive to the search query.

8. The method of claim 1, wherein the structured database is a knowledge graph.

9. The method of claim 1, further comprising:
determining that none of any resources responsive to the search query satisfy one or more criteria;
wherein querying the structured database based on the variations of the at least one parameter, generating the training instances, and training the machine learning model are further in response to determining that none of the any resources responsive to the query satisfy the criteria.

10. The method of claim 1, wherein querying the structured database based on variations of the at least one parameter and the one or more entities comprises querying at least a portion of the structured database that is cached in random-access memory or a solid-state drive.

11. A system comprising:
a network interface;
memory storing instructions;

one or more processors operable to execute the instructions to cause the one or more processors to perform operations comprising:
  receiving, via the network interface, a search query submitted by a client device of a user in response to user interface input provided by the user at the client device;
  parsing the search query to determine one or more entities referenced in the search query and to determine at least one parameter, of the one or more entities, that is sought by the search query;
  querying a structured database based on the at least one parameter and the one or more entities;
  determining, based on the querying, that a known value for the at least one parameter is not defined for the one or more entities in the structured database, wherein determining that the known value for the at least one parameter is not defined comprises determining, based on the querying, that no entry is available in the structured database for the at least one parameter and the one or more entities;
  in response to determining that the known value for the at least one parameter is not defined:
    determining variations of the at least one parameter;
    querying the structured database based on the determined variations of the at least one parameter and the one or more entities to retrieve, for each of a plurality of the determined variations of the parameter:
      a variation value that is defined in the structured database for a corresponding one of the plurality of the determined variations of the at least one parameter;
    generating training instances that each include:
      training instance input that is based on a corresponding one of the plurality of the determined variations of the at least one parameter, and
      training instance output that is based on the retrieved variation value for the corresponding one of the plurality of the determined variations of the at least one parameter;
    training a machine learning model utilizing the generated training instances;
    generating at least one predicted value for the at least one parameter of the search query utilizing the machine learning model; and
    transmitting, to the client device or an additional client device of the user and based on receiving the search query, machine learning model output that is based on the machine learning model trained in response to determining that the known value for the at least one parameter is not defined, the machine learning model output including the predicted value for the at least one parameter of the search query.

12. The system of claim 11, wherein generating the predicted value for the at least one parameter of the search query utilizing the machine learning model includes:
  applying the at least one parameter as at least part of input to the machine learning model; and
  processing the input utilizing the machine learning model to generate the predicted value.

13. The system of claim 12, wherein the machine learning model output further comprises additional content indicating that the predicted value is predicted.

14. The system of claim 11, wherein the machine learning model output further comprises an interactive interface for the trained machine learning model.

15. The system of claim 14, wherein the interactive interface comprises a graphical interface and wherein the operations further comprise:
  receiving an additional parameter in response to further user interface input directed to the interactive interface;
  generating an additional predicted value for the additional parameter utilizing the machine learning model; and
  causing the graphical interface to be adapted to display the additional predicted value generated utilizing the machine learning model.

16. The system of claim 11, wherein the operations further comprise:
  storing, in an index, an association of the machine learning model with one or multiple of:
    the one or more entities,
    the at least one parameter, and
    the variations.

17. The system of claim 16, wherein the wherein the operations further comprise:
  receiving, after the indexing, an additional search query;
  parsing the additional search query to determine that the additional search query includes one or multiple of:
    the one or more entities,
    the at least one parameter, and
    the variations; and
  determining that the machine learning model is responsive to the search query based on the search query including, and the machine learning model also having the association in the index with, one or multiple of:
    the one or more entities,
    the at least one parameter, and
    the variations; and
  responding to the additional search query utilizing the machine learning model based on determining that the machine learning model is responsive to the search query.

18. The system of claim 11, wherein the structured database is a knowledge graph.

19. The system of claim 11, wherein the operations further comprise:
  determining that none of any resources responsive to the search query satisfy one or more criteria;
  wherein querying the structured database based on the variations of the at least one parameter, generating the training instances, and training the machine learning model are further in response to determining that none of the any resources responsive to the query satisfy the criteria.

20. The system of claim 11, wherein querying the structured database based on variations of the at least one parameter and the one or more entities includes querying at least a portion of the structured database that is cached in random-access memory or a solid-state drive.

* * * * *